Sept. 12, 1939.    R. C. CLERK    2,173,036
GEAR CHANGING MEANS FOR MOTOR VEHICLES
Original Filed May 15, 1936    3 Sheets-Sheet 2
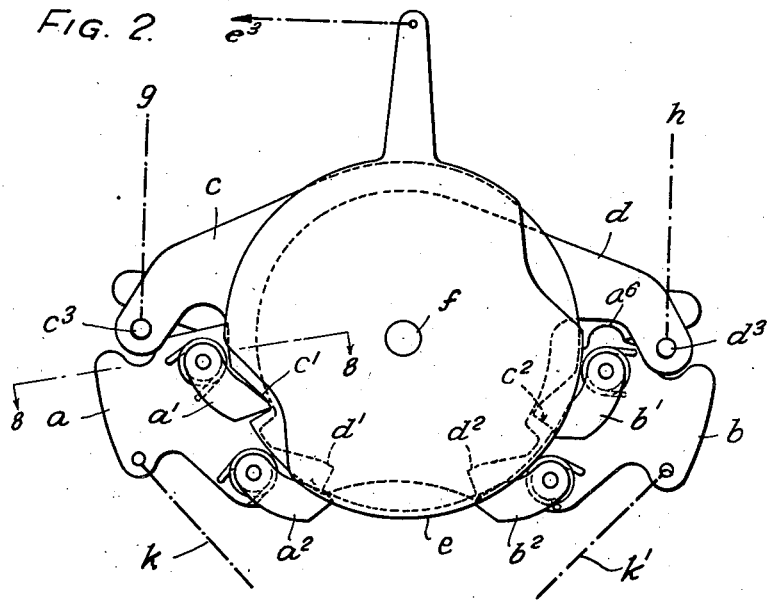
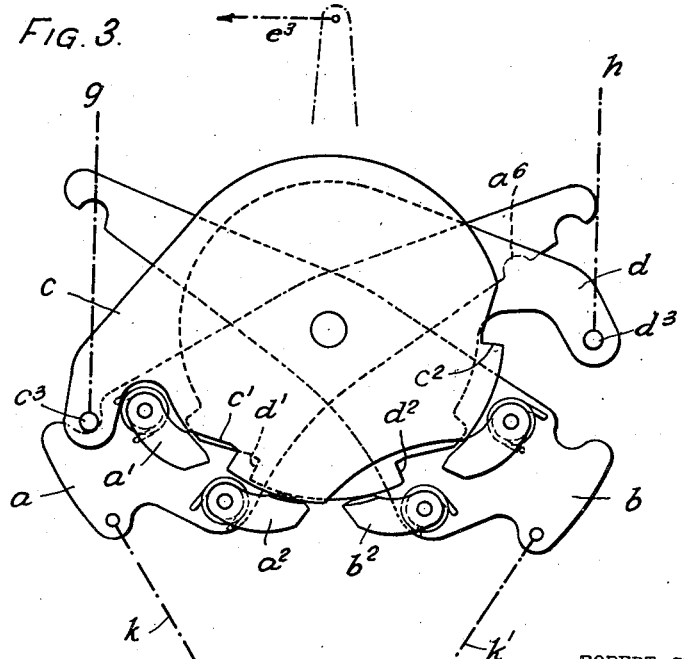
INVENTOR
ROBERT CECIL CLERK
By Norris & Bateman
ATTORNEYS Sept. 12, 1939.　　　　R. C. CLERK　　　　2,173,036
GEAR CHANGING MEANS FOR MOTOR VEHICLES
Original Filed May 15, 1936　　　3 Sheets-Sheet 3
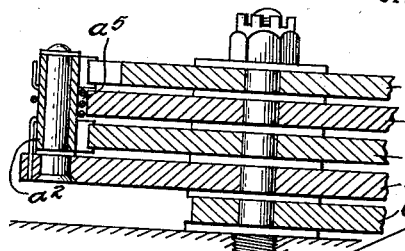
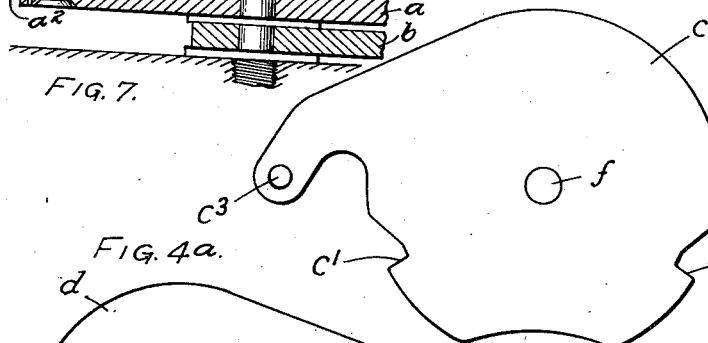
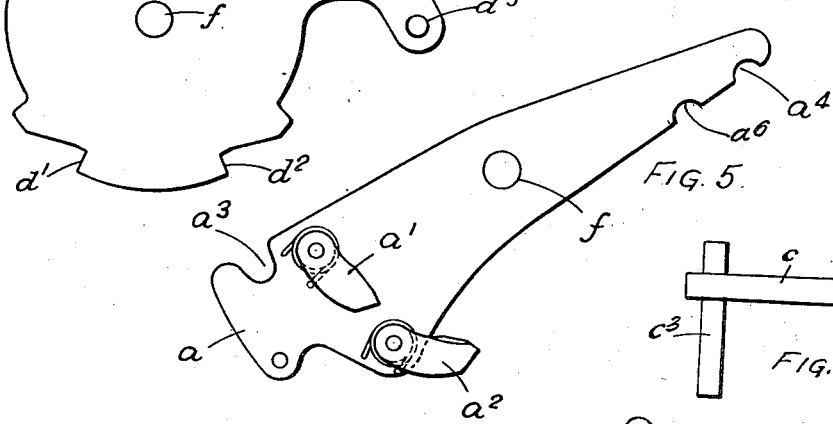
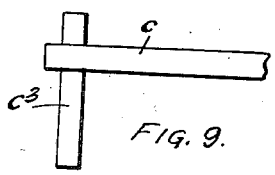
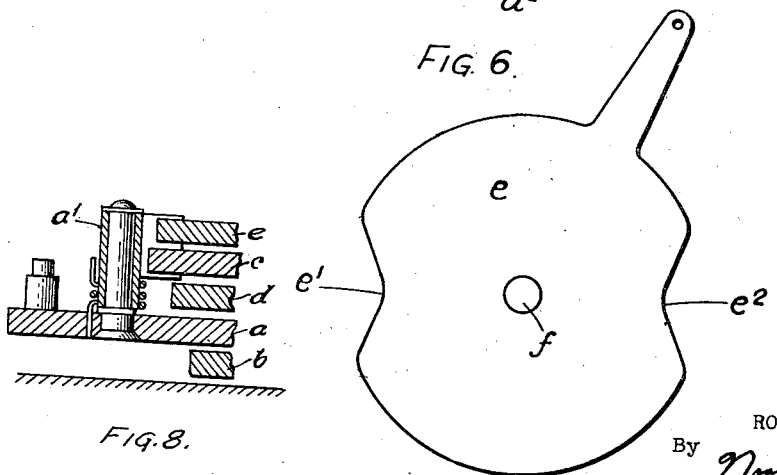
INVENTOR
ROBERT CECIL CLERK
By *Norris & Bateman*
ATTORNEYS Patented Sept. 12, 1939

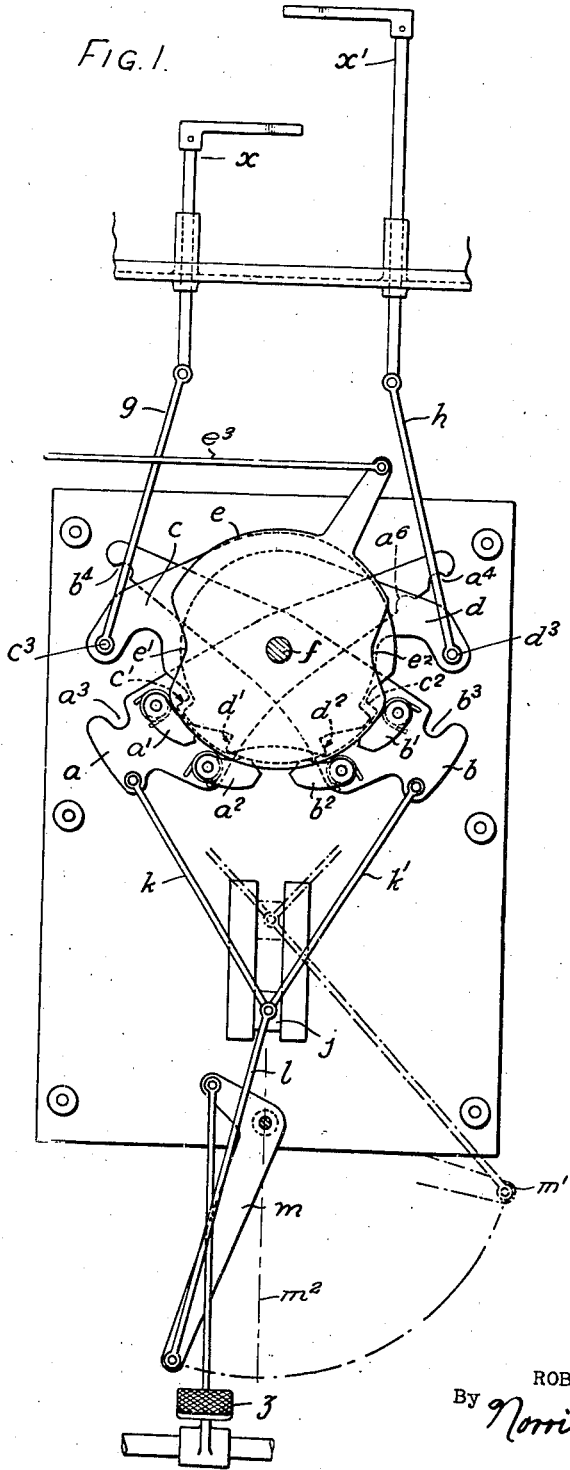

2,173,036

UNITED STATES PATENT OFFICE 2,173,036

GEAR CHANGING MEANS FOR MOTOR VEHICLES

Robert Cecil Clerk, Egham, England, assignor to Hydraulic Coupling Patents Limited, London, England, a company of Great Britain Application May 15, 1936, Serial No. 79,975.
Renewed November 18, 1937. In Great Britain May 18, 1935

5 Claims. (Cl. 74—334)

The present invention relates to pre-selector gear-changing mechanism associated with change-speed gearing of the kind in which selector members are actuated to engage and disengage the different speeds, the mechanism being provided with levers capable of being moved by an executive control member and carrying pawls cooperating with ratchet teeth provided on additional levers adapted to actuate the selector members of the change-speed gearing.

An object of the present invention is to provide a pre-selector mechanism which consists largely of flat parts and is therefore capable of being cheaply produced in large numbers.

A further object is to provide an improved pre-selector mechanism in which operation of the executive control member in one direction brings the change-speed gearing into a neutral condition, while operation of the executive control member in the other direction causes the engagement of the pre-selected gear.

Another object is to provide a pre-selector mechanism whereby, after the executive control member has been moved in one direction to yield neutral, a gear may be selected without pre-selection, and engaged by the return movement of said control member.

A still further object is to provide a pre-selector control mechanism which eliminates any risk of the pawls jamming and interfering with the easy operation of the pre-selector control member.

Other objects and advantages of the invention will be apparent from the following description and the annexed diagrammatic drawings which relate to an example of the invention as applied to a change-speed gearing yielding three forward speeds and reverse, the gearing having two sliding selector rods and being associated with a main friction clutch the control pedal of which forms the executive control member of the gearing.

In these drawings:

Fig. 1 represents the positions of the elements when the clutch pedal is in the normal engaged position and all the selector levers are in the neutral position.

Fig. 2 shows one of the pawls in engagement with one of the ratchet teeth when the clutch pedal has been depressed, and partially released.

Fig. 3 shows the position of the elements after the pedal has been released, moving the ratchet into the gear-engaging position followed by the disengagement of this pawl from the tooth.

Fig. 4 is a detail view of one ratchet lever;

Fig. 4a is a similar view of the other ratchet lever;

Fig. 5 is a detail view of one of the two pawl levers;

Fig. 6 is a detail view of a selector masking member (which is omitted from Fig. 3 so as to show more clearly the parts beneath); and Figs. 7 and 8 are sections of details taken on the lines 7—7 and 8—8 in Fig. 2.

Fig. 9 is an elevation of one end of one of the selector rod levers.

As shown in the drawings, a pair of levers $a$ and $b$, which are operated with the engine clutch, a pair of selector-rod levers $c$ and $d$ and a profile or masking selector device $e$ are all mounted on a common pivot $f$. The lever $a$ carries two spring-actuated pawls $a'$ and $a^2$ of which the function is to actuate one ratchet tooth respectively on each of the levers $c$ and $d$, and the lever $b$ carries two spring-actuated pawls $b'$ and $b^2$ adapted to actuate respectively other ratchet teeth on the selector-rod levers $c$ and $d$. The lever $c$, as shown in Fig. 4, is formed with two ratchet teeth $c'$ and $c^2$ for engagement by pawls $a'$ and $b'$ respectively, and the lever $d$ is formed with two similar teeth $d'$ and $d^2$ for cooperation with pawls $a^2$ and $b^2$. The selector masking device $e$, shown separately in Fig. 6, is of irregular shape, being formed with two selector depressions $e'$, $e^2$, the arrangement being such that by means of a connecting rod $e^3$ connected to a suitable pre-selector lever (not shown) the masking device can be moved into a position corresponding to any one of three speeds or reverse so that the corresponding pawl selected can be allowed to fall into engagement with one of the ratchet teeth on the lever $c$ or the lever $d$ for subsequent actuation of the same.

The pawls $a^2$ and $b^2$, which cooperate with the lever $d$ and the masking device $e$, are provided with gaps, as indicated at $a^5$ in Fig. 7, in alignment with the lever $c$, so that they cannot cooperate with this lever. The pawls $a^1$ and $b^1$, which cooperate with the lever $c$ and the masking device $e$, are of such thickness, as shown in Fig. 8, that they cannot cooperate with the lever $d$.

The levers $c$ and $d$ are provided respectively with pins $c^3$ and $d^3$ which project into the paths of and thereby co-operate with recesses $a^3$, $a^4$ and $b^3$, $b^4$ formed in the levers $a$ and $b$ respectively, and the lever $a$ is provided with a notch $a^6$ to enable this lever to clear the boss of the pawl $b'$. A rod $g$ leads from the lever $c$ to a selector fork $x$ and a rod $h$ leads from the lever $d$ to a second selector fork $x'$, the rods $g$ and $h$ being pivotally connected respectively to upwardly projecting portions of the pins $c^3$ and $d^3$.

A sliding block $j$ is connected by rods $k$ and $k'$ to the levers $a$ and $b$, and by a connection $l$ to a bell-crank lever $m$ connected to a pedal $z$ of the main or engine clutch (not shown). The lever $m$ is in the position shown in Fig. 1 when the main clutch is engaged. The purpose of this device will be explained later.

The operation of the apparatus is as follows: starting from the neutral position shown in Fig. 1, wherein all of the pawls are masked or held out of engagement, the masking device $e$ is moved by a pre-selector lever into, say, the position shown in Fig. 2. When the clutch pedal $z$ is depressed (rocked downwardly in Fig. 1) the main clutch is disengaged as the lever $m$ is moved to the position $m^2$; and, as the lever $m$ moves on to the position $m^1$, the pawls are carried backwards by the levers $a$ and $b$. As the clutch pedal $z$ is allowed to begin its upward movement, the unbaulked pawl falls by spring pressure into its appropriate ratchet. Such a position is shown in Fig. 2, where the pawl $a^1$ is in engagement with the unmasked tooth $c^1$ so that on further release of the clutch pedal, when the lever $m$ swings back to the position $m^2$ (Fig. 1), the levers $a$ and $c$, which are now locked in mutual engagement, will move together to the forward limit of pawl movement and actuate rod $x$ downwardly so as to engage the reqired gear, following which, as the lever $m$ moves from position $m^2$ to the end position shown in Fig. 1, the main clutch is re-engaged and the pawl moves back away from its tooth a slight distance, being raised by the inclined portion of the ratchet $c^1$ so as not to impede the mask $e$ on the latter's next movement as described below. Downward movement of the selector rod $x$ is accordingly effected by the pawl $a^1$, and upward movement of this rod is effected by the pawl $b^1$. Downward movement of the selector rod $x^1$ is effected by the pawl $b^2$ and upward movement of this rod is effected by the pawl $a^2$.

The masking member $e$ is now actuated to pre-select a different gear. Thereafter depression of the pedal $z$ to disengage the clutch causes angular movement of the lever $m$ over the dead centre $m^2$ relatively to the connection $l$ to the position $m^1$, so that the sliding block $j$ first moves slightly down from the position of Fig. 1 before being carried up to its highest limit position $j^1$ at complete depression of the clutch pedal. During depression of the pedal one of the depressions $a^3$, $b^4$, or $b^3$, $a^4$ co-acts with one of the projections $c^3$ or $d^3$, according to which gear was previously engaged, returning this to the neutral position. Following this the pre-selected pawl and ratchet co-acts so as to engage the desired gear, as explained above, during the reverse movement of the bell-crank lever caused by release of the clutch pedal.

Although the device has been described as pedal-operated, it is obvious that a suitable servo device may be used to operate the mechanism in place of pedal actuation.

The invention is applicable both to manual pre-selection and automatic selection, the changes taking place only on operation of the executive control member.

Although the invention has been described as applied to gearing yielding three forward speeds and reverse, it is clearly also applicable to gearing yielding other combinations of speeds.

Having thus described the nature of the said invention and the best means I know of carrying the same into practical effect, I claim:

1. In a gear-changing mechanism, a selective gear box having a plurality of selector elements adapted to be shifted to a neutral position and to predetermined gear positions, an executive control member, a plurality of pawl levers connected to said executive control member and carrying a plurality of pawls, a plurality of ratchet levers connected respectively to said selector elements and adapted to be selectively engaged by the pawls of said pawl levers, a pre-selector masking member mounted for rocking movement adjacent said pawl and ratchet levers and providing at least one gap for allowing one of said pawls to engage a selected ratchet lever when the masking member is disposed in a predetermined position, and for maintaining the other pawls in inoperative position, movement of said executive control member in one direction serving to carry said pawl levers backwards and allow a pawl to be selected by falling into said gap in said pre-selector masking member, and means for causing said pawl levers to return any previously actuated selector element to neutral position, said executive control member, when moved in the opposite direction, being operable to cause said selected pawl to rock one of said ratchet levers and bring its associated selector element into the selected speed.

2. In a gear-changing mechanism, a change-speed gearing comprising two selector members movable into different positions to yield a plurality of gear ratios and a neutral condition, an executive control member, two pawl levers so connected to said control member as to be moved oppositely to each other, two ratchet levers connected respectively to said selector members, pawls resiliently mounted on said pawl levers and selectively engageable with said ratchet levers, and pre-selector masking means mounted for rocking movement adjacent to said pawl and ratchet levers and cooperating with said pawls so as to allow any pawl pre-selected to resiliently engage one or the other of said ratchet levers and to maintain other of said pawls inoperative, said pawl levers being so shaped as to engage said ratchet levers when the latter are not in the neutral positions and to return them to neutral on operation of said control member in one direction, and the pre-selected pawl serving, on operation of said control member in the other direction, to impart to the ratchet lever engaged therewith a movement serving to bring the associated selector member into the selected gear position.

3. In a gear-changing mechanism, a change-speed gearing comprising two selector members movable into different positions to yield a plurality of gear ratios and a neutral condition, an executive control member, a pivot pin having mounted thereon two pawl levers, two ratchet levers and pre-selector masking means, said ratchet levers being connected respectively to said selector members, and said pawl levers being connected to said control member so as to be movable oppositely to each other on displacement of said control member, and pawls resiliently mounted on said pawl levers and selectively engageable with said ratchet levers under control of said pre-selector masking means, said ratchet levers being engageable, when in a gear position, by said pawl levers and restored to neutral when said pawl levers are moved on intial displacement of said control member, and the pawl pre-selected by said masking means engaging and imparting a gear-engaging motion to one of said ratchet levers on the return motion of said pawl levers due to final displacement of said control member.

4. Gear-changing mechanism comprising a change-speed gearing having a selector member movable to one side and the other of a neutral position to engage alternative speeds, an executive control member, a ratchet lever connected to said selector member and having two oppositely-directed ratchet teeth, mounted co-axially with said ratchet lever, two pawl levers and a pre-selector masking member, said pawl levers being so connected to said control member as to be movable oppositely to one another, abutment portions on said ratchet lever shaped to be engaged between said pawl levers and thereby to set said selector member in its neutral position on displacement of said control member in one direction, and two pawls mounted on said pawl levers respectively and resiliently urged towards said ratchet lever, said pre-selector masking member being operable to release said pawls alternatively into engagement with said ratchet lever, whereby on displacement of said control member in the other direction, the pre-selected pawl engages one of said ratchet teeth and imparts the desired gear-engaging movement to said selector member.

5. In a gear-changing mechanism, a change-speed gearing comprising a selector lever movable to one side and the other of a neutral position to yield alternative gear ratios, two actuating levers disposed adjacent to said selector lever, an executive control member connected to said actuating levers for moving them oppositely to one another, said selector lever having a portion engageable between said actuating levers so that said selector is moved to its neutral position on movement of said control member in one direction, two resiliently-mounted oppositely-directed ratchet pawls for connecting said actuating levers respectively with said selector lever when said control member is moved in the other direction, and pre-selector masking means operable for rendering said pawls alternatively operative, the connecttion between said actuating levers and said control member serving to effect a slight retrograde movement of said actuating levers as said control member completes its movement in said other direction, so as to unlock the operative one of said pawls from said selector lever and thereby permit displacement of said pre-selector masking means.

ROBERT CECIL CLERK.